United States Patent
Krekel et al.

(10) Patent No.: US 10,717,432 B2
(45) Date of Patent: Jul. 21, 2020

(54) PARK-ASSIST BASED ON VEHICLE DOOR OPEN POSITIONS

(71) Applicant: Ford Global Technologies, LLC, Dearborn, MI (US)

(72) Inventors: Markus Krekel, Wermelskirchen (DE); Ahmed Benmimoun, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/130,542

(22) Filed: Sep. 13, 2018

(65) Prior Publication Data

US 2020/0086850 A1 Mar. 19, 2020

(51) Int. Cl.
*B60W 30/06* (2006.01)
*B60W 50/14* (2020.01)
*G06K 9/00* (2006.01)
*E05F 15/40* (2015.01)
*B60W 40/08* (2012.01)

(52) U.S. Cl.
CPC .......... *B60W 30/06* (2013.01); *B60W 40/08* (2013.01); *B60W 50/14* (2013.01); *E05F 15/40* (2015.01); *G06K 9/00838* (2013.01); *B60W 2040/0809* (2013.01); *B60W 2050/143* (2013.01)

(58) Field of Classification Search
None
See application file for complete search history.

(56) References Cited

U.S. PATENT DOCUMENTS

| | | | |
|---|---|---|---|
| 5,959,724 | A | 9/1999 | Izumi |
| 6,275,754 | B1 | 8/2001 | Shimizu |
| 6,356,828 | B1 | 3/2002 | Shimizu |
| 6,452,617 | B1 | 9/2002 | Bates |
| 6,476,730 | B2 | 11/2002 | Kakinami |
| 6,477,260 | B1 | 11/2002 | Shimomura |
| 6,657,555 | B2 | 12/2003 | Shimizu |
| 6,683,539 | B2 | 1/2004 | Trajkovic |
| 6,724,322 | B2 | 4/2004 | Tang |
| 6,744,364 | B2 | 6/2004 | Wathen |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Tamara L Weber
(74) *Attorney, Agent, or Firm* — Frank Lollo; Eversheds Sutherland (US) LLP

(57) ABSTRACT

Method and apparatus are disclosed for park-assist based on vehicle door open positions. An example vehicle includes a door, a door sensor, a range-detection sensor, and a controller. The controller is to determine, via the door sensor, a preferred angle of an occupant for opening the door and detect, via the range-detection sensor, a spot that is unoccupied. The controller also is to predict a maximum angle for opening the door within the spot. The example vehicle also includes an autonomy unit to perform park-assist into the spot responsive to the maximum angle equaling or exceeding the preferred angle.

18 Claims, 5 Drawing Sheets

(56) References Cited

U.S. PATENT DOCUMENTS

| | | |
|---|---|---|
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,081,390 B1* | 9/2018 | Anderson .............. G08G 1/143 |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0248257 A1* | 10/2009 | Hoshino .............. B60N 2/002 701/49 |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |

(56) References Cited

U.S. PATENT DOCUMENTS

| | | |
|---|---|---|
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke et al. |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0030737 A1* | 2/2017 | Elie .................... B60J 5/047 |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |

(56) References Cited

U.S. PATENT DOCUMENTS

| | | |
|---|---|---|
| 2017/0297620 A1 | 10/2017 | Lavoie |
| 2017/0301241 A1 | 10/2017 | Urhahne |
| 2017/0308075 A1 | 10/2017 | Whitaker |
| 2017/0314318 A1* | 11/2017 | Hassenpflug ......... B60W 30/08 |
| 2017/0334353 A1* | 11/2017 | Gillott ................ B62D 15/0285 |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo et al. |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0053421 A1* | 2/2018 | Ohl ....................... B60W 30/06 |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0273029 A1* | 9/2018 | Marcial-Simon ........................... G01C 21/3602 |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0016331 A1* | 1/2019 | Carlson ................ B60W 30/06 |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 A | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102012008858 A1 | 11/2012 |
| DE | 102009060169 A1 | 6/2013 |
| DE | 102011080148 A1 | 7/2013 |
| DE | 102012200725 A1 | 9/2013 |
| DE | 102010034129 B2 | 10/2013 |
| DE | 102011122421 A1 | 6/2014 |
| DE | 102012222972 A1 | 6/2014 |
| DE | 102013016342 A1 | 1/2015 |
| DE | 102014009077 A1 | 2/2015 |
| DE | 102012215218 A1 | 4/2015 |
| DE | 102012222972 A1 | 5/2015 |
| DE | 102013019904 A1 | 5/2015 |
| DE | 102014007915 A1 | 12/2015 |
| DE | 102014007915 A1 | 2/2016 |
| DE | 102014011802 A1 | 2/2016 |
| DE | 102014111570 A1 | 2/2016 |
| DE | 102014015655 A1 | 4/2016 |
| DE | 102014226458 A1 | 6/2016 |
| DE | 102015209976 A1 | 12/2016 |
| DE | 102014015655 A1 | 5/2017 |
| DE | 102016011916 A1 | 6/2017 |
| DE | 102016125282 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| EP | 2135788 B1 | 6/2017 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 2004142543 A | 5/2004 |
| JP | 2004287884 A | 10/2004 |
| JP | 2005193742 A | 7/2005 |
| JP | 2004142543 A | 4/2009 |
| JP | 2016119032 A | 4/2009 |
| JP | 2004287884 A | 7/2014 |
| JP | 2014134082 A | 7/2014 |
| JP | 2016119032 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20100006714 A | 1/2010 |
| KR | 20160051993 A | 1/2010 |
| KR | 20130106005 A | 9/2013 |
| KR | 20160039460 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2015/068032 A1 | 8/2016 |
| WO | WO 2015/193058 A1 | 9/2016 |
| WO | WO 2017/062448 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/097942 A1 | 7/2017 |
| WO | WO 2017/118510 A1 | 7/2017 |

OTHER PUBLICATIONS

Land Rover develops a smartphone remote control for its SUVs, James Vincent, Jun. 18, 2015.

Al-Sherbaz, Ali et al., Hybridisation of GNSS with other wireless/sensors technologies on board smartphones to offer seamless outdoors-indoors positioning for LBS applications, Apr. 2016, 3 pages.

(56) References Cited

OTHER PUBLICATIONS

Jingbin Liu, IParking: An Intelligent Indoor Location-Based Smartphone Parking Service, Oct. 31, 2012, 15 pages.
Alberto Broggi and Elena Cardarelli, Vehicle Detection for Autonomous Parking Using a Soft-Cascade ADA Boost Classifier, Jun. 8, 2014.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Land Rover, Land Rover Remote Control Via IPhone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.

\* cited by examiner

PARK-ASSIST BASED ON VEHICLE DOOR OPEN POSITIONS

TECHNICAL FIELD

The present disclosure generally relates to park-assist and, more specifically, to park-assist based on vehicle door open positions.

BACKGROUND

Many vehicles include functions in which at least some motive functions of a vehicle are autonomously and/or semi-autonomously controlled by the vehicle. For example, some vehicles include cruise control features (e.g., adaptive cruise control features) in which the vehicle controls acceleration and/or deceleration of the vehicle so that a speed of the vehicle is maintained. Some vehicles include park-assist features in which the vehicle autonomously and/or semi-autonomously controls motive functions of the vehicle to park the vehicle into a parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for park-assist based on vehicle door open positions. An example disclosed vehicle includes a door, a door sensor, a range-detection sensor, and a controller. The controller is to determine, via the door sensor, a preferred angle of an occupant for opening the door and detect, via the range-detection sensor, a spot that is unoccupied. The controller also is to predict a maximum angle for opening the door within the spot. The example disclosed vehicle also includes an autonomy unit to perform park-assist into the spot responsive to the maximum angle equaling or exceeding the preferred angle.

In some examples, the door includes a side mirror and the door sensor includes a camera coupled to the side mirror to monitor an angle of the door. In some examples, the door sensor includes a potentiometer to monitor an angle of the door. In some examples, the range-detection sensor includes at least one of a camera and a proximity sensor to monitor a surrounding area. In some examples, the door sensor is to collect a door-angle measurement each time the occupant opens the door. In some such examples, the controller determines the preferred angle based on a plurality of door-angle measurements collected during a plurality of occurrences of the occupant opening the door.

Some examples further including a human-machine interface (HMI) unit. In some such examples, the HMI unit is to collect an identity of the occupant for the controller. In some such examples, the HMI unit is to collect the preferred angle as a user input from the occupant.

Some examples further include a communication module for wireless communication. In such examples, the controller is to identify the occupant upon wirelessly communicating with a mobile device associated with the occupant.

In some examples, the autonomy unit does not perform the park-assist into the spot when the maximum angle is less than the preferred angle.

In some examples, the controller is to determine, via the door sensor, a permissible angle of the occupant for opening the door. In such examples, the permissible angle is less than the preferred angle. In some such examples, the autonomy unit does not perform the park-assist into the spot when the maximum angle is less than the permissible angle. Some such examples further include a human-machine interface (HMI) to present an alert when the maximum angle is between the preferred angle and the permissible angle and subsequently enable the occupant to select whether to park into the spot. Further, in some such examples, the autonomy unit is to perform the park-assist into the spot based on a selection by the occupant.

An example disclosed method includes determining, via a door sensor, a preferred angle of an occupant for opening a door of a vehicle and detecting, via a range-detection sensor, a parking spot that is unoccupied. The example disclosed method also includes predicting, via a processor, a maximum angle for opening the door within the parking spot and performing, via an autonomy unit, park-assist into the parking spot when the maximum angle is greater than or equal to the preferred angle.

Some examples further include not performing the park-assist into the parking spot when the maximum angle is less than the preferred angle.

Some examples further include determining a permissible angle of an occupant for opening the door, the permissible angle is less than the preferred angle. Some such examples further include not performing the park-assist into the parking spot when the maximum angle is less than the permissible angle. Some examples further include presenting, a human-machine interface (HMI) unit, an alert when the maximum angle is between the preferred angle and the permissible angle and subsequently enabling, via the HMI unit, the occupant to select whether to park into the parking spot.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
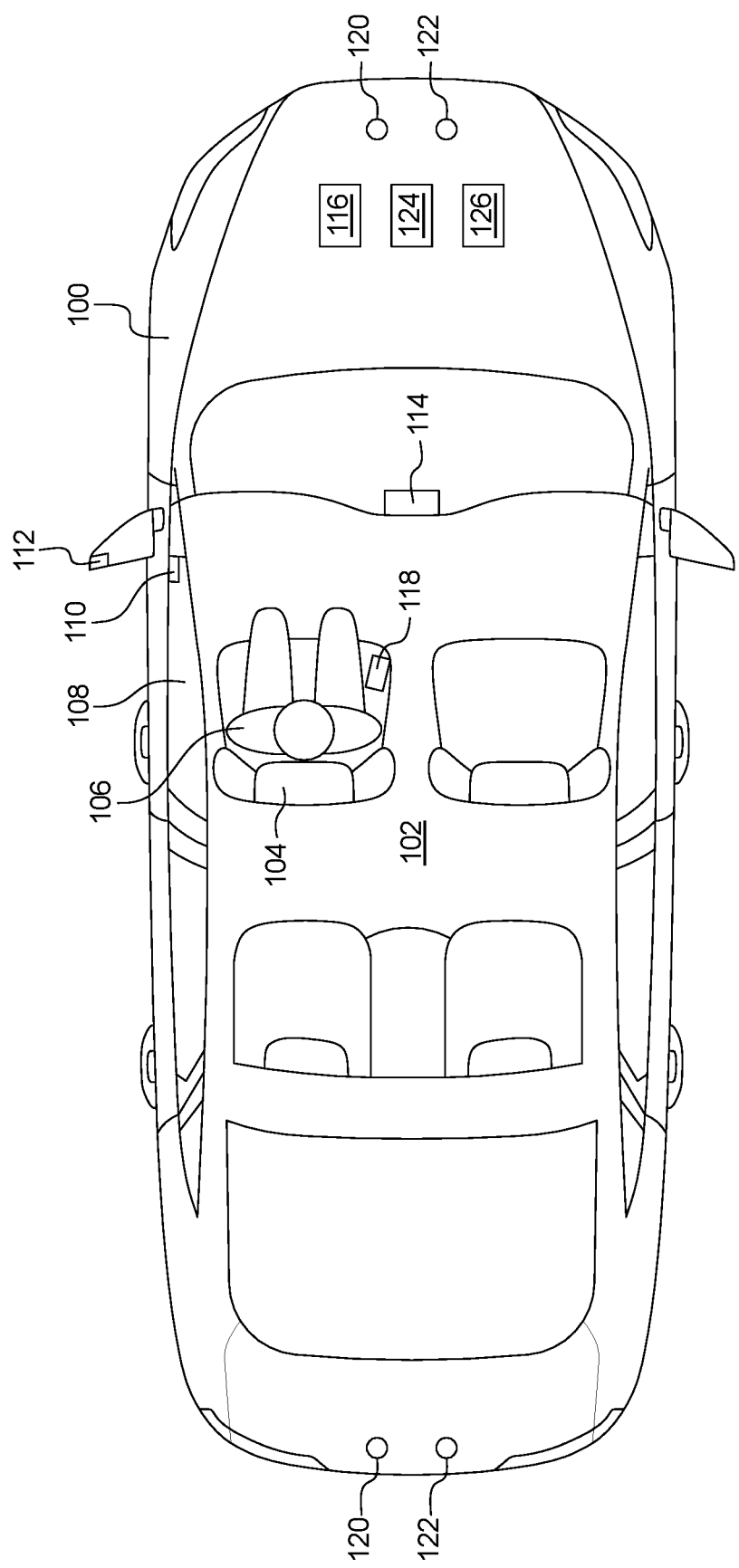
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions of a vehicle are autonomously and/or semi-autonomously controlled by the vehicle. For example, some vehicles include cruise control features (e.g., adaptive cruise control features) in which the vehicle controls acceleration and/or deceleration of the vehicle so that a speed of the vehicle is maintained. Some vehicles include park-assist features in which the vehicle autonomously and/or semi-autonomously controls motive functions of the vehicle to park the vehicle into a parking spot.

As used herein, "vehicle park-assist," "park-assist," and "park assist" refer to a system in which a vehicle controls its motive functions without direct steering or velocity input from a driver to autonomously park within a parking spot. For example, an autonomy unit of a park-assist system controls the motive functions of the vehicle while an operator remains within a cabin of the vehicle.

Typically, available parking spots have different sizes. That is, some parking spots may be wider than others. In wider parking spots, an occupant is able to open a door to a greater degree without contacting an adjacent object (e.g., another parked vehicle). In thinner parking spots, an occupant potentially may be unable to open a door to the degree necessary, due to an adjacent object, that enables the occupant to exit the vehicle. Further, different occupants of a vehicle may have different requirements and/or preferences regarding an opening angle for a door when entering or leaving a cabin of a vehicle. For instance, more agile occupants may require and/or prefer relatively smaller opening angles, and less mobile occupants may require and/or prefer relatively larger opening angles. In some instances, a park-assist system potentially may park a vehicle into a parking spot in which an occupant is unable and/or finds it difficult to exit the vehicle due to an adjacent object preventing a vehicle door from being opened to a required and/or preferred degree.

Examples disclosed herein include a park-assist system of a vehicle that identifies potential parking spots based on user-specific requirements and/or preferences of an occupant. The park-assist system identifies preferred, permissible, and/or other opening angles for occupants opening a door to enter and/or exit a cabin of the vehicle. In some examples, an occupant provides a preferred opening angle, a permissible opening angle, and/or other characterized opening angle(s) to the park-assist system (e.g., via a human-machine interface). Further, in some examples, the park-assist system utilizes one or more sensors to determine a preferred opening angle, a permissible opening angle, and/or other characterized opening angle(s) of an occupant based upon the occupant using the door to enter and/or exit the vehicle. Based on the opening angle(s) corresponding to an occupant and a detected size of an available parking spot, the park-assist system determines whether to park in the available parking spot.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input).

In the illustrated example, the vehicle 100 includes a cabin 102 in which a seat 104 (also referred to as a driver's seat) is located for an occupant 106 (e.g., an operator such as a driver). Further, the vehicle 100 includes a door 108 (e.g., a driver's door) that, when open, enables the occupant 106 to enter the cabin 102 to reach the seat 104 and/or to exit the cabin 102 from the seat 104. Additionally or alternatively, the vehicle 100 includes one or more other seats (e.g., a front passenger seat, rear seats, etc.) for one or more other occupants. In such examples, the vehicle 100 may include one or more additional doors to facilitate those occupant(s) entering and/or exiting the cabin 102 of the vehicle 100.

Further, the vehicle 100 includes one or more door sensors to monitor an angle at which the door 108 is opened. In the illustrated example, the vehicle 100 includes a door-angle sensor 110 and a camera 112 to monitor an angle of the door 108. For example, the door-angle sensor 110 (e.g., a potentiometer) is positioned near a hinge of the door 108 to detect an angle at which the door 108 is opened. The camera 112 of the illustrated example is coupled to a side mirror of the door to capture image(s) and/or video that enable a door angle of the door 108 to be determined. For example, a controller determines an angle at which the door 108 is opened based upon an angle and/or orientation of a body of the vehicle 100 relative to the door 108 within image(s) and/or video by the camera 112.

In the illustrated example, the vehicle 100 includes a display 114 that is configured to present interface(s) and/or other output information to the occupant 106 of the vehicle 100. For example, the display 114 is a center console display (e.g., a liquid crystal display (LCD), an organic light emitting diode (OLED) display, a flat panel display, a solid state display, etc.) and/or a heads-up display. Further, in some examples, the display 114 is a touchscreen that is configured to collect input information from the occupant 106.

The vehicle 100 of the illustrated example also includes a communication module 116 that includes wired or wireless network interfaces to enable communication with other devices and/or external networks. For example, the communication module 116 includes a wireless personal area network (WPAN) module that is configured to wirelessly communicate with a mobile device 118 (e.g., a key fob, a smart phone, a wearable, a smart watch, a tablet, etc.) of the occupant 106 via short-range wireless communication protocol(s). In some examples, the communication module 116 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 116 is configured to wirelessly communicate via Wi-Fi®, Near Field Communication (NFC), ultra-wide band (UWB) communication, ultra-high frequency (UHF)

communication, low frequency (LF) communication, and/or any other communication protocol that enables the communication module 116 to communicatively couple to the mobile device 118 of the occupant 106 when the occupant is positioned within and/or near the vehicle 100. The external network(s) may be a public network, such as the Internet; a private network, such as an intranet; or combinations thereof, and may utilize a variety of networking protocols now available or later developed including, but not limited to, TCP/IP-based networking protocols. The communication module 116 also includes hardware (e.g., processors, memory, storage, antenna, etc.) and software to control the wired or wireless network interfaces. For example, the communication module 116 includes one or more communication controllers for cellular networks, such as Global System for Mobile Communications (GSM), Universal Mobile Telecommunications System (UMTS), Long Term Evolution (LTE), Code Division Multiple Access (CDMA).

In the illustrated example, the vehicle 100 includes range-detection sensors. For example, the range-detection sensors enable the vehicle 100 to perform autonomous and/or semi-autonomous driving maneuvers. As used herein, a "range-detection sensor" refers to an electronic device that is configured to collect information to detect a presence of and distance to nearby object(s). In the illustrated example, the range-detection sensors of the vehicle 100 include proximity sensors 120 and cameras 122. The proximity sensors 120 are configured to detect the presence, proximity, and/or location of object(s) near the vehicle 100. For example, the proximity sensors 120 include radar sensor(s), lidar sensor(s), ultrasonic sensor(s), and/or any other sensor configured to detect the presence, proximity, and/or location of nearby object(s). A radar sensor detects and locates an object via radio waves, a lidar sensor detects and locates the object via lasers, and an ultrasonic sensor detects and locates the object via ultrasound waves. Further, the cameras 122 capture image(s) and/or video of a surrounding area of the vehicle 100 to enable nearby object(s) to be identified and located. In the illustrated example, the range-detection sensors (e.g., the proximity sensors 120, the cameras 122) are located on each side of the vehicle 100 (e.g., front, rear, left, right) to enable the range-detection sensors in monitoring each portion of the surrounding area.

The vehicle 100 of the illustrated example also includes an autonomy unit 124. For example, the autonomy unit 124 is an electronic control unit (e.g., one of a plurality of electronic control units 510 of FIG. 5). The autonomy unit 124 is configured to control performance of autonomous and/or semi-autonomous driving maneuvers of the vehicle 100 based upon, at least in part, data collected by the proximity sensors 120, the cameras 122, and/or other range-detection sensors of the vehicle 100.

The vehicle 100 also includes a park-assist controller 126 that is configured to identify parking spots for a park-assist system based on user preferences of the occupant 106 and/or other occupant(s) of the vehicle 100. For example, the park-assist controller 126 determines a preferred angle (e.g., a preferred angle 406 of FIG. 4C) of the occupant 106 for opening the door 108 when entering and/or exiting the cabin 102 of the vehicle 100. In some examples, the park-assist controller 126 determines the preferred angle of the occupant 106 based on measurement(s) collected by the door-angle sensor 110, the camera 112, and/or any other door sensor. The park-assist controller 126 also detects an unoccupied parking spot (e.g., a parking spot 202 of FIG. 2) based on, for example, information collected by the proximity sensors 120, the cameras 122, and/or other range-detection sensors. Upon detecting the unoccupied parking spot, the park-assist controller 126 predicts a maximum angle (e.g., a maximum angle 302 of FIG. 3) at which the door 108 is able to be opened if positioned in the unoccupied parking spot.

Further, the park-assist controller 126 compares the preferred angle of the occupant 106 to the maximum door angle within the unoccupied parking spot to determine whether the door 108 would be able to be opened to the preferred angle when positioned within the unoccupied parking spot. In response to the park-assist controller 126 determining that the maximum door angle is greater than or equal to the preferred angle, the park-assist controller 126 causes the autonomy unit 124 to park the vehicle 100 into the unoccupied parking spot via park-assist. Otherwise, in response to the park-assist controller 126 determining that the maximum door angle is less than the preferred angle, the park-assist controller 126 performs other function(s) that are disclosed below in greater detail to facilitate the park-assist system of the vehicle 100.

Figure 2:
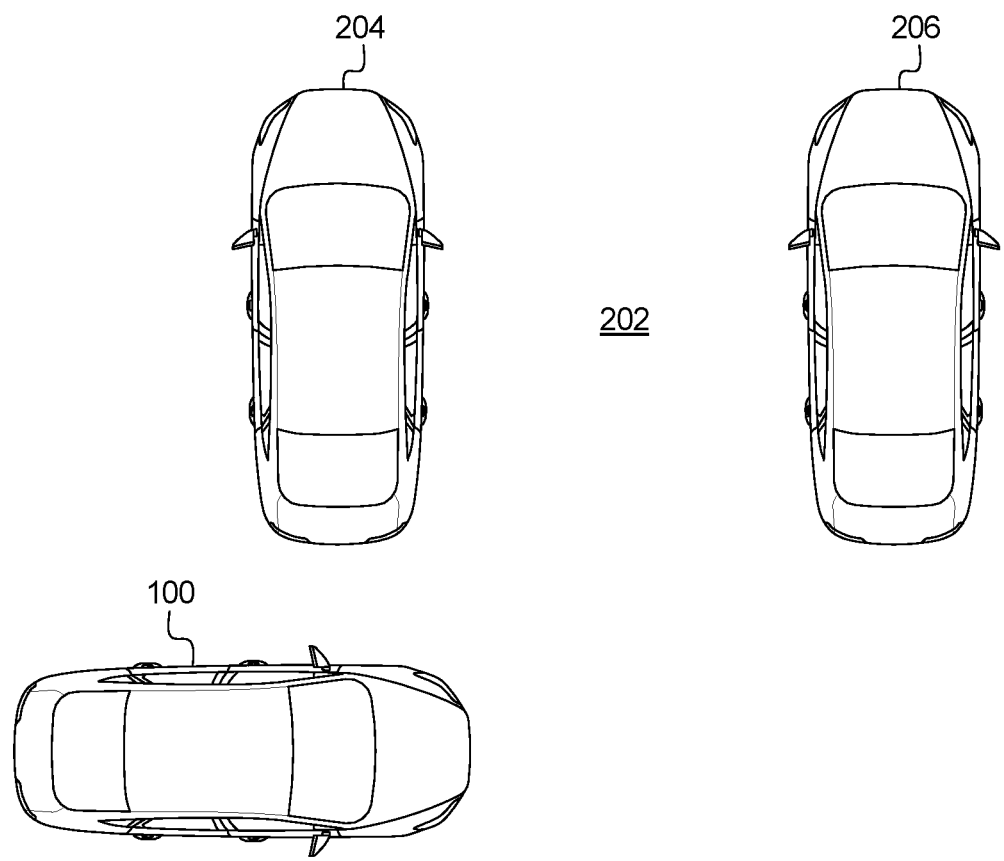
FIG. 2 depicts the vehicle of FIG. 1 approaching a parking spot that is unoccupied.

FIG. 2 depicts the vehicle 100 approaching a parking spot 202 that is unoccupied. In the illustrated example, the parking spot 202 is positioned between a vehicle 204 and a vehicle 206. In other examples, the parking spot 202 may be positioned between different objects (e.g., a wall, a dumpster, etc.). The park-assist controller 126 of the vehicle 100 identifies the parking spot 202 and detects that the parking spot 202 is unoccupied based on information collected by the range-detection sensors (e.g., the proximity sensors 120, the cameras 122). Further, the park-assist controller 126 identifies other characteristics of the parking spot 202 (e.g., a width, a length, an orientation, etc.) based on information collected by the range-detection sensors.

Figure 3:
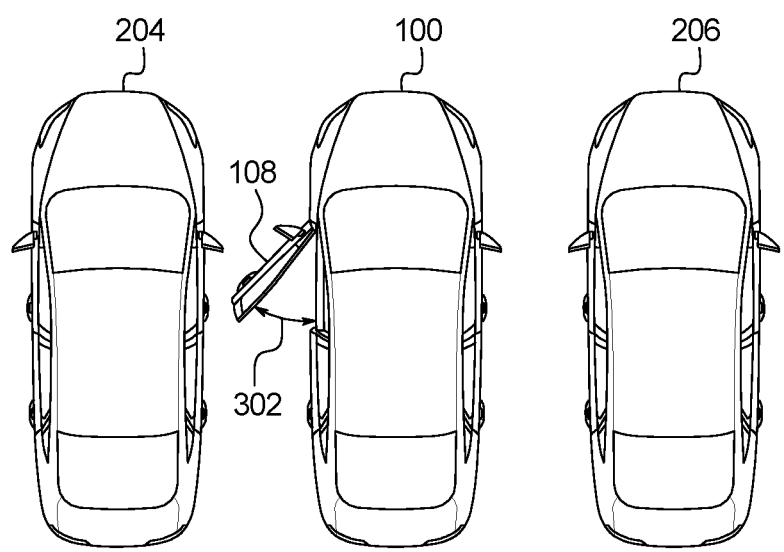
FIG. 3 depicts a door of the vehicle of FIG. 1 at a maximum door angle when the vehicle is located in the parking spot of FIG. 2.

FIG. 3 depicts the door 108 of the vehicle 100 at a maximum angle 302 when the vehicle 100 is located in the parking spot 202. When the vehicle 100 is near the parking spot 202 is unoccupied, the park-assist controller 126 predicts the maximum angle 302 of the door 108 if the vehicle 100 were to be parked in the parking spot 202. As illustrated in FIG. 3, the maximum angle 302 may be limited by an object (e.g., the vehicle 204, the vehicle 206) that is next to and/or within the parking spot 202. In other instances, the maximum angle 302 may be limited by an hinge of the door 108. In the illustrated example, the park-assist controller 126 predicts the maximum angle 302 based on (i) a width of the parking spot 202, (ii) location(s) of nearby object(s) (e.g., the vehicle 204, the vehicle 206), (iii) a predicted parking position of the vehicle 100 within the parking spot 202, (iv) a width of the vehicle 100, (v) a position of the door 108 relative to the body of the vehicle 100, and/or (vi) a length of the door 108.

Figure 4A:
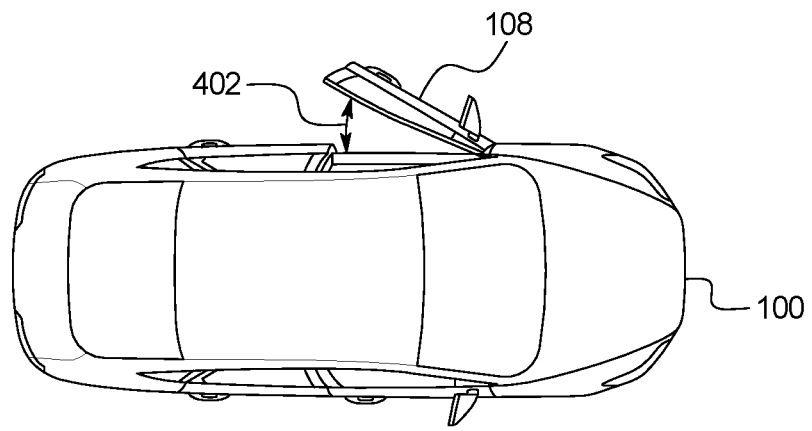
FIG. 4A depicts a first open position of a door of the vehicle of FIG. 1.
Figure 4B:
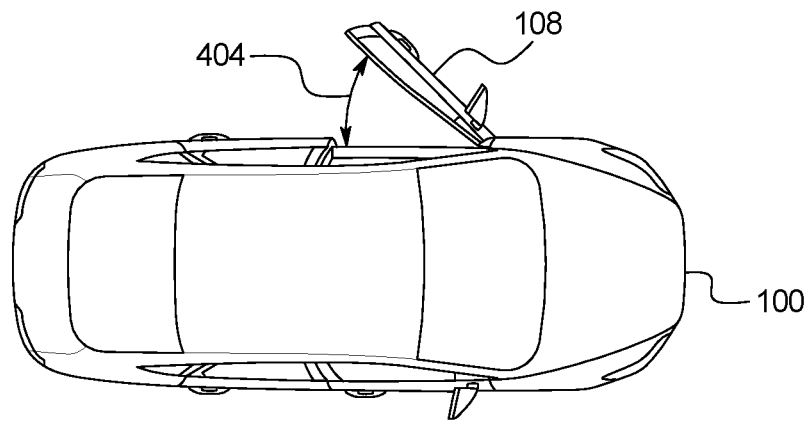
FIG. 4B depicts a second open position of a door of the vehicle of FIG. 1.
Figure 4C:
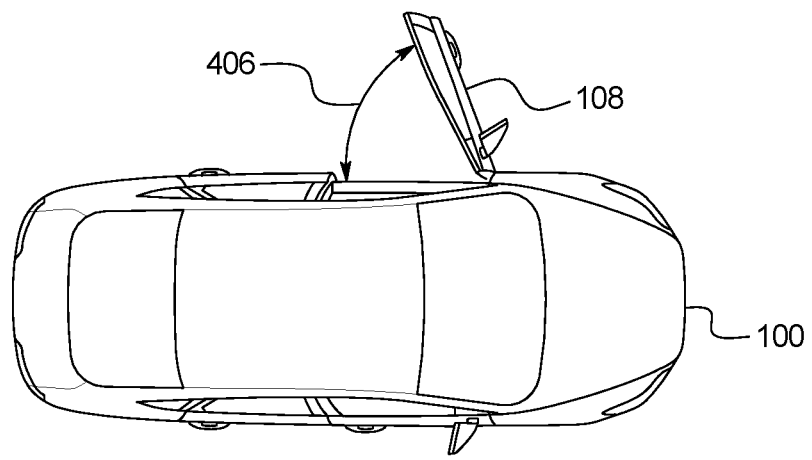
FIG. 4C depicts a third open position of a door of the vehicle of FIG. 1.

FIGS. 4A-4C depict the door 108 of the vehicle 100 in various open positions. In particular, FIG. 4A depicts the door 108 opened to a permissible angle 402 of the occupant 106, FIG. 4B depicts the door 108 opened to an intermediate angle 404 of the occupant 106, and FIG. 4C depicts the door 108 opened to a preferred angle 406 of the occupant 106. As illustrated in FIGS. 4A-4C, the permissible angle 402 is less than the intermediate angle 404, and the intermediate angle 404 is less than the preferred angle 406. In operation, the park-assist controller 126 determines one or more door-angle preferences (e.g., the permissible angle 402, the intermediate angle 404, the preferred angle 406) of the occupant 106 for the door 108 of the vehicle 100.

To associate a door-angle preference with the occupant 106, the park-assist controller 126 determines an identity of the occupant 106. For example, the occupant 106 provides his or her identity to the park-assist controller 126 via a human-machine interface (HMI) (e.g., an HMI unit 504 of FIG. 5) of the vehicle 100. That is, the HMI collects the identity of the occupant 106 from the occupant 106. Additionally or alternatively, the park-assist controller 126 determines the identity of the occupant 106 based on wireless communication between the communication module 116 of the vehicle 100 and the mobile device 118 of the occupant 106. For example, the park-assist controller 126 determines the identity of the occupant 106 in response to (1) the communication module 116 being in communication with the mobile device 118 of the occupant 106, (2) the park-assist controller 126 determining (e.g., based on a received signal strength indicator (RSSI) and/or other characteristic of the wireless communication) that the mobile device 118 is located at and/or near the seat 104 of the vehicle 100, and (3) the park-assist controller 126 having previously associated the mobile device 118 with the occupant 106.

Upon identifying the occupant 106, the park-assist controller 126 determines one or more door-angle preferences (e.g., the permissible angle 402, the intermediate angle 404, the preferred angle 406) of the occupant 106 for the door 108. For example, the occupant 106 provides one or more door-angle preferences to the park-assist controller 126 via an HMI of the vehicle 100. That is, the HMI collects one or more door-angle preferences of the occupant 106 from the occupant 106. In other examples, the park-assist controller 126 determines a door-angle preference upon (1) the occupant 106 activating identification of a door-angle preference via an HMI of the vehicle 100, (2) the occupant 106 subsequently positioning the door 108 at the door-angle preference, and (3) a door sensor (e.g., the door-angle sensor 110, the camera 112) detecting the angle at which the occupant 106 positioned the door 108. Additionally or alternatively, the park-assist controller 126 utilizes an algorithm to determine one or more door-angle preferences based upon a plurality of door-angle measurements collected by a door sensor during a plurality of occurrences of the occupant 106 opening the door 108. That is, the door sensor is configured to collect a door-angle measurement each time the park-assist controller 126 has identified that the occupant 106 is opening the door 108.

Further, when the park-assist controller 126 has detected an unoccupied parking spot (e.g., the parking spot 202), the one or more door-angle preferences of the occupant 106 are compared to a maximum door angle (e.g., the maximum angle 302) of the door 108 within the parking spot 202. For example, the park-assist controller 126 compares the permissible angle 402, the intermediate angle 404, the preferred angle 406, and/or other door-angle preference(s) to the maximum angle 302. Further, the park-assist controller 126 initiates one or more vehicle features based upon the comparison(s).

For example, if the maximum angle 302 is greater than or equal to the preferred angle 406, the park-assist controller 126 instructs the autonomy unit 124 to perform park-assist motive functions to park the vehicle 100 within the parking spot 202. That is, the autonomy unit 124 performs park-assist into the parking spot 202 responsive to the maximum angle 302 equaling or exceeding the preferred angle 406. In some examples, the park-assist controller 126 (1) presents the parking spot 202 to the occupant 106 via the display 114 and (2) instructs the autonomy unit 124 to perform the park-assist motive functions upon receiving confirmation to do so by the occupant 106.

In some examples, if the maximum angle 302 is less than the preferred angle 406, the park-assist controller 126 (1) does not present, via the display 114, the parking spot 202 as an option to the occupant 106, (2) instructs the autonomy unit 124 to not perform park-assist into the parking spot 202, and (3) enables the vehicle 100 to proceed to another parking spot. That is, in such examples, the autonomy unit 124 does not perform park-assist into the parking spot 202 responsive to the maximum angle 302 being less than the preferred angle 406. Further, in some examples, if the maximum angle 302 is less than the preferred angle 406, the park-assist controller 126 compares the maximum angle 302 to one or more other door-angle preference(s) to determine which, if any, vehicle function to initiate.

For example, if the maximum angle 302 is less than the permissible angle 402, the park-assist controller 126 (1) does not present, via the display 114, the parking spot 202 as an option to the occupant 106, (2) instructs the autonomy unit 124 to not perform park-assist into the parking spot 202, and (3) enables the vehicle 100 to proceed to another parking spot. That is, in such examples, the autonomy unit 124 does not perform park-assist into the parking spot 202 responsive to the maximum angle 302 being less than the permissible angle 402. Additionally or alternatively, if the maximum angle 302 is between the permissible angle 402 and the preferred angle 406, the park-assist controller 126 presents an alert to the occupant 106. For example, the park-assist controller 126 presents the alert via the display 114 and/or other output device of the vehicle 100. Further, in some such examples, the park-assist controller 126 enables the occupant 106 to select, via an HMI, whether the autonomy unit 124 is to park the vehicle 100 in the parking spot 202. If the occupant 106 selects to park the vehicle 100, the park-assist controller 126 instructs the autonomy unit 124 to perform park-assist motive functions to park the vehicle 100 within the parking spot 202. Otherwise, if the occupant 106 selects to not park the vehicle 100, the park-assist controller 126 enables the vehicle 100 to proceed to another parking spot.

Further, in some examples, the park-assist controller 126 compares the maximum angle 302 to the intermediate angle 404. For example, the park-assist controller 126 initiates one vehicle function upon determining that the maximum angle 302 is between the permissible angle 402 and the intermediate angle 404, and the park-assist controller 126 initiates a different vehicle function upon determining that the maximum angle 302 is between the intermediate angle 404 and the preferred angle 406.

FIGS. 4A-4C depict the park-assist controller 126 utilizing three door-angle preferences when determining whether to initiate park-assist for a parking spot. In other examples, the park-assist controller 126 may utilize less or more door-angle preferences when determining whether to initiate park-assist for a parking spot. Further, the illustrated example depicts the park-assist controller 126 monitoring an operator (e.g., a driver) and a driver's door when determining whether to initiate park-assist for a parking spot. Additionally or alternatively, the park-assist controller 126 may monitor one or more passengers and/or one or more passenger doors when determining whether to initiate park-assist for a parking spot.

Figure 5:
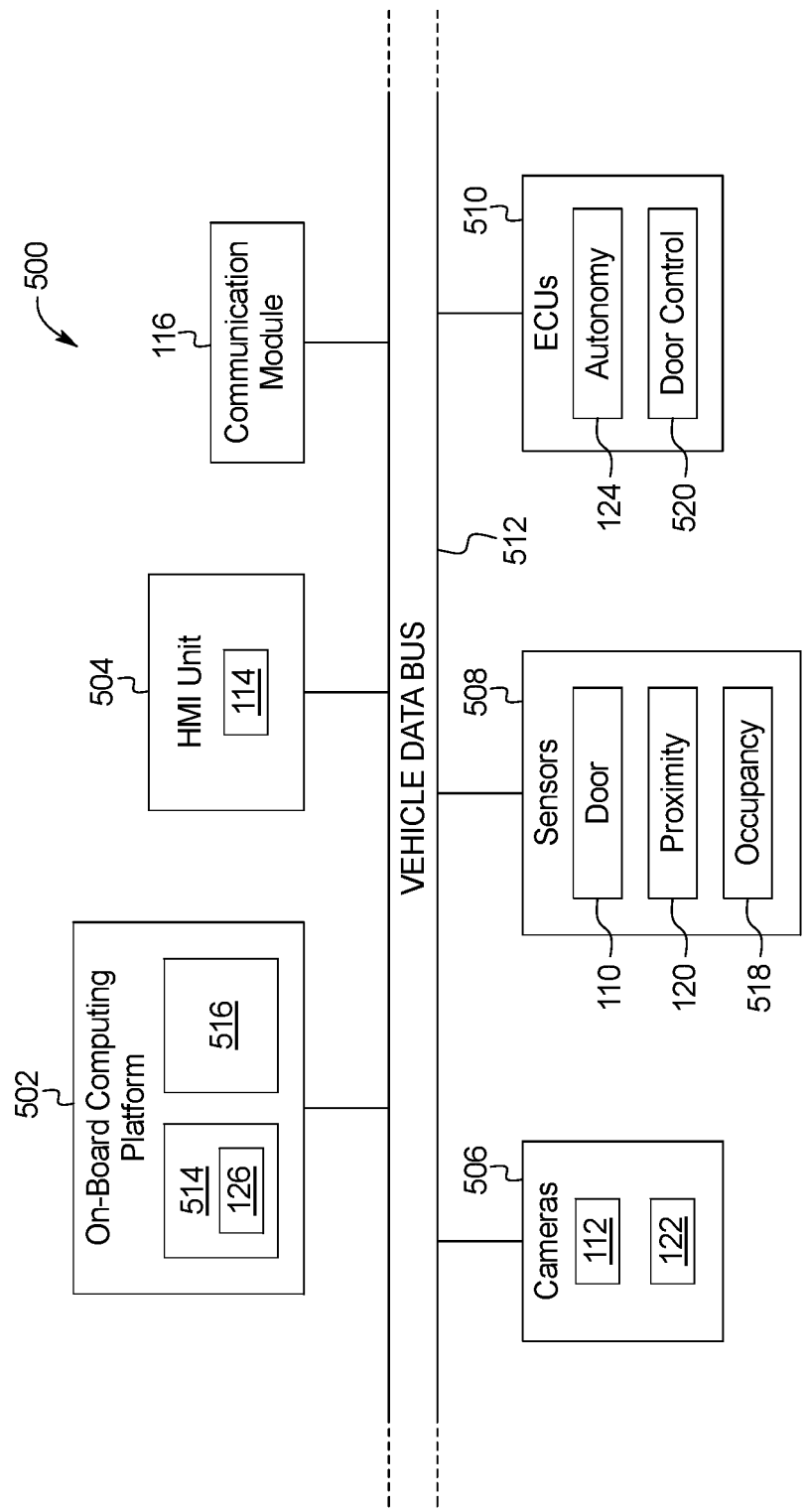
FIG. 5 is a block diagram of electronic components of the vehicle of FIG. 1.

FIG. 5 is a block diagram of electronic components 500 of the vehicle 100. In the illustrated example, the electronic components 500 include an on-board computing platform 502, an HMI unit 504, the communication module 116, cameras 506, sensors 508, electronic control units (ECUs) 510, and a vehicle data bus 512.

The on-board computing platform 502 includes a processor 514 (also referred to as a microcontroller unit and a controller) and memory 516. In the illustrated example, the processor 514 of the on-board computing platform 502 is structured to include the park-assist controller 126. In other examples, park-assist controller 126 is incorporated into another ECU (e.g., the autonomy unit 124) with its own processor and memory. The processor 514 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 516 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 516 includes multiple kinds of memory, particularly volatile memory and non-volatile memory.

The memory 516 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 516, the computer readable medium, and/or within the processor 514 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The HMI unit 504 provides an interface between the vehicle 100 and a user. The HMI unit 504 includes digital and/or analog interfaces (e.g., input devices and output devices) to receive input from and display information for the user(s). The input devices include, for example, a control knob, an instrument panel, a digital camera for image capture and/or visual command recognition, a touchscreen, an audio input device (e.g., cabin microphone), buttons, or a touchpad. The output devices may include instrument cluster outputs (e.g., dials, lighting devices), actuators, a heads-up display, the display 114 (e.g., a touchscreen) and/or speakers. In the illustrated example, the HMI unit 504 includes hardware (e.g., a processor or controller, memory, storage, etc.) and software (e.g., an operating system, etc.) for an infotainment system (e.g., SYNC® and MyFord Touch® by Ford®). Additionally, the HMI unit 504 displays the infotainment system on, for example, the display 114.

The cameras 506 are arranged in and/or around the vehicle 100 to capture image(s) and/or video of an interior area within the cabin 102 and/or an exterior area surrounding the vehicle 100. One or more of the cameras 506 may be mounted around an exterior of the vehicle 100. Additionally or alternatively, one or more of the cameras 506 may be mounted inside the cabin 102 of the vehicle 100. In the illustrated example, the cameras 506 include the camera 112 configured to monitor an angle of the door 108 and the cameras 122 configured to monitor the surrounding area of the vehicle 100.

The sensors 508 are arranged in and/or around the vehicle 100 to monitor properties of the vehicle 100 and/or an environment in which the vehicle 100 is located. One or more of the sensors 508 may be mounted to measure properties around an exterior of the vehicle 100. Additionally or alternatively, one or more of the sensors 508 may be mounted inside the cabin 102 of the vehicle 100 or in a body of the vehicle 100 (e.g., an engine compartment, wheel wells, etc.) to measure properties in an interior of the vehicle 100. For example, the sensors 508 include accelerometers, odometers, tachometers, pitch and yaw sensors, wheel speed sensors, microphones, tire pressure sensors, biometric sensors and/or sensors of any other suitable type. In the illustrated example, the sensors 508 include the door-angle sensor 110 (e.g., a potentiometer) configured to monitor an angle of the door 108 and the proximity sensors 120 configured to monitor the surrounding area of the vehicle 100. Further, the sensors 508 include an occupancy sensor (e.g., a pressure sensor, a seatbelt sensor, etc.) that is configured to detect whether an occupant (e.g., the occupant 106) is seated in the seat 104.

The ECUs 510 monitor and control the subsystems of the vehicle 100. For example, the ECUs 510 are discrete sets of electronics that include their own circuit(s) (e.g., integrated circuits, microprocessors, memory, storage, etc.) and firmware, sensors, actuators, and/or mounting hardware. The ECUs 510 communicate and exchange information via a vehicle data bus (e.g., the vehicle data bus 512). Additionally, the ECUs 510 may communicate properties (e.g., status of the ECUs 510, sensor readings, control state, error and diagnostic codes, etc.) to and/or receive requests from each other. For example, the vehicle 100 may have dozens of the ECUs 510 that are positioned in various locations around the vehicle 100 and are communicatively coupled by the vehicle data bus 512.

In the illustrated example, the ECUs 510 include the autonomy unit 124 and a door control unit 520. For example, the autonomy unit 124 is configured to control performance of autonomous and/or semi-autonomous driving maneuvers of the vehicle 100 based upon, at least in part, information collected by the proximity sensors 120, the cameras 122, and/or other range-detection sensors. The door control unit 520 controls one or more subsystems of the door 108 and/or another door of the vehicle 100. For example, the door control unit 520 includes circuits that drive one or more relays, brushed direct current (DC) motors (e.g., to control power locks, power windows, power mirrors, etc.), stepper motors, LEDs, etc. to control one or more door subsystems. In some examples, the door control unit 520 determines a door angle of the door 10106 based on information collected by the door-angle sensor 110, the camera 112, and/or any other door sensor of the door 108.

The vehicle data bus 512 communicatively couples the communication module 116, the on-board computing platform 502, the HMI unit 504, the cameras 506, the sensors 508, and the ECUs 510. In some examples, the vehicle data bus 512 includes one or more data buses. The vehicle data bus 512 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
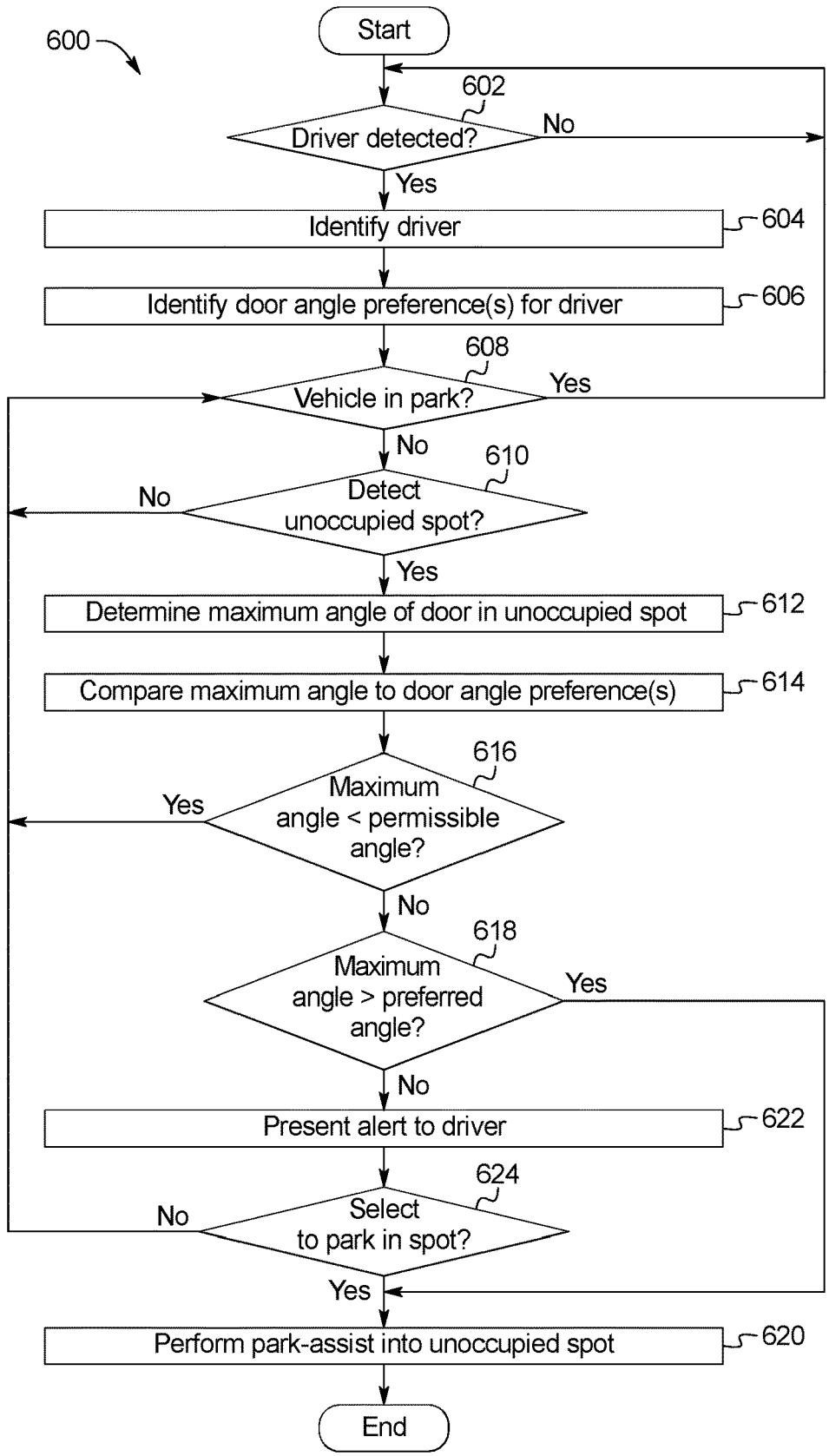
FIG. 6 is a flowchart for performing park-assist functions based on a vehicle door positions in accordance with the teachings herein.

FIG. 6 is a flowchart of an example method 600 to perform park-assist functions based on vehicle door positions. The flowchart of FIG. 6 is representative of machine readable instructions that are stored in memory (such as the memory 516 of FIG. 5) and include one or more programs which, when executed by a processor (such as the processor 514 of FIG. 5), cause the vehicle 100 to implement the example park-assist controller 126 of FIGS. 1 and 5. While the example program is described with reference to the flowchart illustrated in FIG. 6, many other methods of implementing the example park-assist controller 126 may alternatively be used. For example, the order of execution of the blocks may be rearranged, changed, eliminated, and/or combined to perform the method 600. Further, because the method 600 is disclosed in connection with the components of FIGS. 1-2, some functions of those components will not be described in detail below.

Initially, at block 602, the park-assist controller 126 detects whether an operator (e.g., the occupant 106), such as a driver, is present. For example, the park-assist controller 126 detects that the operator is present (i) via the occupancy sensor 518, (ii) based on communication between the communication module 116 and the mobile device 118, (iii) upon receiving an input from the operator via the HMI unit 504, etc. In response to the park-assist controller 126 detecting that an operator is not present, the method 600 remains at block 602. Otherwise, in response to the park-assist controller 126 detecting that an operator is present, the method 600 proceeds to block 604.

At block 604, the park-assist controller 126 identifies the operator (e.g., the occupant 106). For example, the park-assist controller 126 identifies the operator based on communication between the communication module 116 and the mobile device 118 and/or upon receiving an input from the operator via the HMI unit 504. At block 606, the park-assist controller 126 identifies door-angle preference(s) of the operator for opening the door 108. For example, the park-assist controller 126 collects the door-angle preference(s) from the memory 516 of the vehicle 100 and/or from a remote server via the communication module 116.

At block 608, the park-assist controller 126 determines whether the vehicle 100 is in park (e.g., via a transmission position sensor). In response to the park-assist controller 126 determining that the vehicle 100 is in park, the method 600 returns to block 602. Otherwise, in response to the park-assist controller 126 determining that the vehicle 100 is not in park, the method 600 proceeds to block 610.

At block 610, the park-assist controller 126 determines whether an unoccupied parking spot (e.g., the parking spot 202) is detected. In response to the park-assist controller 126 determining that an unoccupied parking spot is not detected, the method 600 returns to block 608. Otherwise, in response to the park-assist controller 126 determining that an unoccupied parking spot is detected, the method 600 proceeds to block 612 at which the park-assist controller 126 determines a maximum door angle for opening the door 108 within the unoccupied parking spot. At block 614, the park-assist controller 126 compares the maximum door angle of the door 108 within the unoccupied parking spot to the door-angle preferences of the operator.

At block 616, the park-assist controller 126 determines whether the maximum door angle is less than a permissible angle of the operator. In response to the park-assist controller 126 determining that the maximum door angle is less than the permissible angle, the method 600 returns to block 608. Otherwise, in response to the park-assist controller 126 determining that the maximum door angle is not less than the permissible angle, the method 600 proceeds to block 618.

At block 618, the park-assist controller 126 determines whether the maximum door angle is greater than a preferred angle of the operator. In response to the park-assist controller 126 determining that the maximum door angle is greater than the preferred angle, the method 600 proceeds to block 620 at which the autonomy unit 124 performs park-assist motive functions to park the vehicle into the unoccupied parking spot. Otherwise, in response to the park-assist controller 126 determining that the maximum door angle is not greater than the preferred angle, the method 600 proceeds to block 622.

At block 622, the park-assist controller 126 presents an alert, via the HMI unit 504, to notify the operator that the maximum door angle of the door 108 within the unoccupied parking spot would be between the permissible angle and the preferred angle of the operator. At block 624, the park-assist controller 126 determines whether the operator has selected to have the vehicle 100 parked in the unoccupied parking spot. For example, the park-assist controller 126 receives the selection of the operator via the HMI unit 504. In response to the park-assist controller 126 identifying that the operator has selected not to have the vehicle 100 parked in the unoccupied parking spot, the method 600 returns to block 608. Otherwise, in response to the park-assist controller 126 identifying that the operator has selected to have the vehicle 100 parked in the unoccupied parking spot, the method 600 proceeds to block 620 at which the autonomy unit 124 performs park-assist motive functions to park the vehicle into the unoccupied parking spot.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a door;
   a door sensor;
   a range-detection sensor;
   a controller configured to:
   determine, via the door sensor, a preferred angle of an occupant for opening the door;
   detect, via the range-detection sensor, a spot that is unoccupied; and predict a maximum angle for opening the door within the spot;

determine that the maximum angle is between the preferred angle and a permissible angle;

provide, based on the determination that the maximum angle is between the preferred angle and the permissible angle, an option for the occupant to select whether to park into the spot; and receive, in response to the option for the occupant to select whether to park in the spot, an indication to park in the spot; and an autonomy unit to perform park-assist into the spot based on the received indication to park in the spot.

2. The vehicle of claim 1, wherein the door includes a side mirror and the door sensor includes a camera coupled to the side mirror to monitor an angle of the door.

3. The vehicle of claim 1, wherein the door sensor includes a potentiometer to monitor an angle of the door.

4. The vehicle of claim 1, wherein the range-detection sensor includes at least one of a camera and a proximity sensor to monitor a surrounding area.

5. The vehicle of claim 1, wherein the door sensor is further configured to collect a door-angle measurement each time the occupant opens the door.

6. The vehicle of claim 5, wherein the controller determines the preferred angle based on a plurality of door-angle measurements collected during a plurality of occurrences of the occupant opening the door.

7. The vehicle of claim 1, further including a human-machine interface (HMI) unit.

8. The vehicle of claim 7, wherein the HMI unit is further configured to collect an identity of the occupant for the controller.

9. The vehicle of claim 7, wherein the HMI unit is further configured to collect the preferred angle as a user input from the occupant.

10. The vehicle of claim 1, further including a communication module for wireless communication, wherein the controller is to identify the occupant upon wirelessly communicating with a mobile device associated with the occupant.

11. The vehicle of claim 1, wherein the autonomy unit does not perform the park-assist into the spot when the maximum angle is less than the preferred angle.

12. The vehicle of claim 1, wherein the permissible angle is less than the preferred angle.

13. The vehicle of claim 12, wherein the autonomy unit does not perform the park-assist into the spot when the maximum angle is less than the permissible angle.

14. The vehicle of claim 1, wherein the autonomy unit is further configured to perform the park-assist into the spot based on a selection by the occupant.

15. A method comprising:

determining, via a door sensor, a preferred angle of an occupant for opening a door of a vehicle;

detecting, via a range-detection sensor, a parking spot that is unoccupied;

predicting, via a processor, a maximum angle for opening the door within the parking spot;

determining that the maximum angle is between the preferred angle and a permissible angle;

providing, based on the determination that the maximum angle is between the preferred angle and the permissible angle, an option for the occupant to select whether to park into the spot;

receiving, in response to the option for the occupant to select whether to park in the spot, an indication to park in the spot; and performing, via an autonomy unit, park-assist into the parking spot based on the received indication to park in the spot.

16. The method of claim 15, further including not performing the park-assist into the parking spot when the maximum angle is less than the preferred angle.

17. The method of claim 15, further including determining a permissible angle of an occupant for opening the door, the permissible angle is less than the preferred angle.

18. The method of claim 17, further including not performing the park-assist into the parking spot when the maximum angle is less than the permissible angle.

* * * * *